United States Patent
Kim et al.

(10) Patent No.: US 9,964,049 B2
(45) Date of Patent: May 8, 2018

(54) METHOD AND SYSTEM FOR CONTROLLING CONTINUOUSLY VARIABLE VALVE TIMING

(71) Applicants: Hyundai Motor Company, Seoul (KR); Kia Motors Corporation, Seoul (KR)

(72) Inventors: Hyun Kim, Whasung-Si (KR); Gang Il Kim, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 337 days.

(21) Appl. No.: 14/797,561

(22) Filed: Jul. 13, 2015

(65) Prior Publication Data

US 2016/0153369 A1 Jun. 2, 2016

(30) Foreign Application Priority Data

Dec. 2, 2014 (KR) .................. 10-2014-0170355

(51) Int. Cl.
*F02D 13/02* (2006.01)
*F02D 41/06* (2006.01)
(Continued)

(52) U.S. Cl.
CPC ............ *F02D 13/02* (2013.01); *F01L 1/3442* (2013.01); *F01L 13/00* (2013.01);
(Continued)

(58) Field of Classification Search
CPC .. F02D 13/02; F02D 13/0215; F02D 13/0234; F02D 13/0249; F02D 2041/001
See application file for complete search history.

(56) References Cited

U.S. PATENT DOCUMENTS

| | | | |
|---|---|---|---|
| 6,024,061 A * | 2/2000 | Adachi | F01L 1/3442 123/90.17 |
| 2010/0042306 A1* | 2/2010 | Gauthier | F01L 1/344 701/102 |
| 2010/0180844 A1* | 7/2010 | Uehama | F01L 1/022 123/90.17 |
| 2010/0241337 A1 | 9/2010 | Watanabe | |
| 2013/0247853 A1* | 9/2013 | Mikawa | F01L 1/34 123/90.15 |
| 2014/0090612 A1* | 4/2014 | Hayashi | F01L 1/3442 123/90.15 |
| 2014/0277999 A1* | 9/2014 | Switkes | F02D 13/0219 701/102 |

(Continued)

FOREIGN PATENT DOCUMENTS

EP 2 706 202 A2 3/2014
JP 2005307818 A * 11/2005
(Continued)

*Primary Examiner* — Erick Solis
*Assistant Examiner* — Anthony L Bacon
(74) *Attorney, Agent, or Firm* — Morgan, Lewis & Bockius LLP

(57) ABSTRACT

A method for controlling continuously variable valve timing (CVVT), may include determining whether a CVVT control is started, detecting a position of a cam and a position of a crankshaft when the CVVT control is started, determining whether the cam is positioned at a locking position based on the positions of the cam and crankshaft, determining whether the cam is controlled to be positioned from the locking position to an advancing position or a holding position, when the cam is positioned at the locking position, and when the cam is controlled to be positioned from the locking position to the advancing position or the holding position and when a condition for performing the CVVT control is satisfied, determining whether a cam torque is negative and performing predetermined CVVT control after waiting a predetermined time when the cam torque is negative.

5 Claims, 5 Drawing Sheets

(51) Int. Cl.
    *F01L 1/344*       (2006.01)
    *F01L 13/00*       (2006.01)
    *F02D 41/00*       (2006.01)

(52) U.S. Cl.
    CPC ....... *F02D 13/0219* (2013.01); *F02D 41/009* (2013.01); *F02D 41/062* (2013.01); *F01L 2001/3443* (2013.01); *F01L 2001/34433* (2013.01); *F01L 2001/34456* (2013.01); *F01L 2001/34463* (2013.01); *F01L 2013/111* (2013.01); *F01L 2013/113* (2013.01); *F01L 2013/116* (2013.01); *F02D 41/0002* (2013.01); *F02D 2013/0292* (2013.01); *F02D 2041/001* (2013.01); *F02D 2200/023* (2013.01); *F02D 2200/024* (2013.01); *F02D 2200/503* (2013.01); *Y02T 10/18* (2013.01)

(56) References Cited

U.S. PATENT DOCUMENTS

2015/0075461 A1*   3/2015   Kato .................... F01L 1/3442
                                                                   123/90.15
2015/0377087 A1*   12/2015   Koo .................... F01L 1/34409
                                                                   701/102

FOREIGN PATENT DOCUMENTS

| JP | 2009-209849 A | 9/2009 |
| JP | 2010-196481 A | 9/2010 |
| JP | 2010-255498 A | 11/2010 |
| JP | 5018563 B2 | 6/2012 |
| KR | 10-0999619 B1 | 12/2010 |

* cited by examiner

METHOD AND SYSTEM FOR CONTROLLING CONTINUOUSLY VARIABLE VALVE TIMING

CROSS-REFERENCE TO RELATED APPLICATION

The present application claims priority to Korean Patent Application No. 10-2014-0170355 filed Dec. 2, 2014, the entire contents of which is incorporated herein for all purposes by this reference.

BACKGROUND OF THE INVENTION

Field of the Invention

The present invention relates to a method and system for controlling continuously variable valve timing (hereafter referred to as a "CVVT" for convenience), and more particularly, to a method and system for controlling CVVT that may prevent a decrease of engine speed due to retarding (or a retard angle) of the CVVT according to a negative cam torque by estimating directivity of cam torque when the CVVT first operates.

Description of Related Art

In general, internal combustion engines, which are apparatuses that generate power by receiving air and fuel from the outside and burning them in a combustion chamber, include an intake valve for drawing the air and fuel into the combustion chamber and an exhaust valve for discharging explosion gas burned in the combustion chamber. The intake valve and the exhaust valve are opened or closed by rotation of a camshaft that rotates with rotation of a crankshaft.

It is required to make timing of opening/closing the valves different in accordance with engine speed, engine load, and the like depending on traveling conditions of a vehicle, in order to increase efficiency of the engine.

In particular, the timing of opening/closing the intake valve has a large influence on efficiency of an engine. That is, when the intake valve is opened in advance, since an overlap period of the valves increases and intake/exhaust inertia flow can be sufficiently used at a high speed, the efficiency of the engine increases, but at a low speed, the efficiency decreases since the amount of remaining gas increases, thus discharge amount of hydrocarbon (HC) increases.

Therefore, a technology that does not set an overlap period of the valves of a camshaft in accordance with the rotation of the camshaft to appropriately control valve timing in accordance with a driving state of the engine has been developed and applied, which is referred to as a CVVT.

The CVVT is an apparatus (or system) that continuously changes an opening time of the intake valve or the exhaust valve by changing a phase of the camshaft at the intake side or the exhaust side in accordance with load of a vehicle, engine speed, and the like. In other words, the CVVT changes the valve overlap period. An object of the CVVT is to reduce exhaust gas, to improve performance, and to stabilize idling.

The valve timing means a period that the intake valve or the exhaust valve opens or closes, and an intake process is a process from opening to closing of the intake valve, while an exhaust process is a process of discharging exhaust gas for a period from opening to closing of the exhaust valve. The timing of opening or closing the valves influences performance of the engine.

The valve overlap means a period that the intake valve and the exhaust valve are simultaneously open. Once the period of the valve overlap is set in a typical engine, it is constantly used in all engine speeds, such that it is disadvantageous at a low engine speed or a high engine speed.

Accordingly, controlling of the valve overlap to fit the engine load consequently improves the engine output, such that an apparatus therefor is a CVVT apparatus or system.

The CVVT apparatus includes a continuously variable valve timing unit, an oil control valve (OCV) that is an oil supply device, an oil temperature sensor (OTS), an oil control valve filter, an oil path, an auto tensioner, etc.

The continuously variable valve timing unit may be mounted on, for example, the camshaft at the exhaust side, the inside thereof includes a housing and a rotor, an advancing (advance angle) chamber and a retarding (retard angle) chamber are provided between the housing and the rotor vane, and oil flows inside through the OCV, such that a rotor vane moves.

Further, the OCV is a core device of the CVVT apparatus, and controls the valve opening/closing time by changing a path of engine oil which is supplied from an oil pump and flows in the continuously variable valve timing unit according to controlling of an engine electronic control unit (ECU).

Density of the engine oil that is a working fluid of the continuously variable valve timing unit changes in accordance with temperature. The OTS measures temperature of the engine oil to compensate for a changed amount of the engine oil density due to the temperature before the engine oil flows into the OCV, and sends the measured temperature to the ECU. The ECU compensates for the changed amount of the engine oil density by driving the OCV based on the measured temperature.

Further, the oil valve control filter filters impurities in the engine oil flowing to the OCV, and the auto tensioner, which is a tension control device of a chain connecting a sprocket of a camshaft at the exhaust side where the CVVT apparatus is disposed with a sprocket of the camshaft at the intake side, ensures stability of performance by preventing delay or deviation of responsiveness and problems in function of the CVVT apparatus.

When the CVVT apparatus controls a position of a cam, not in a maximum retarding angle at the intake side or in a maximum advancing angle at the exhaust side, but therebetween, this control is referred to as intermediate phase CVVT control. According to the intermediate phase CVVT control, operating responsiveness of the CVVT apparatus is good, and a usage range of the cam may widen, thus fuel efficiency is improved and reduction of exhaust gas is achieved.

As shown in FIG. 1, when the ECU 1 applies a pulse width modulation (PWM) signal to the OCV 10, a plunger 12 of the OCV 10 moves toward a target position, such that a position of the cam 20 of the CVVT apparatus 100 is controlled toward a parking position, a retarding position, a holding position, or a advancing position depending on an oil flow path 14. In other words, the oil flow path 14 is changed depending on a position of the plunger 12, thereby operating the CVVT apparatus 20.

The position of the plunger 12 is controlled depending on a duty value of the PWM signal. As shown in FIG. 2, since the position of the plunger 12 is changed in order of the parking position (or a detent position, a locking position), the retarding position, the holding position, and the advancing position, the position of the cam of the CVVT apparatus is controlled depending on the position of the plunger.

In the intermediate phase CVVT apparatus, when the engine is started, the cam is positioned at the parking position, and when an operating condition of the CVVT is satisfied, the ECU 1 controls a position of the cam. When the ECU controls a position of the cam from the parking position to the advancing position or the holding position, the oil flow is changed to an advance oil flow or a holding oil flow passing by a retard oil flow. In this case, when oil flows in the retard oil flow path under adverse conditions, since the CVVT apparatus may be momentarily retarded, the engine speed may decreases, starting stability may deteriorate, and customer complaints may occur.

Meanwhile, as shown in FIG. 3, a cam torque occurs depending on movement of the cam 20 in an engine system for a vehicle. The cam torque may periodically have a positive value or a negative value. The cam torque is affected by a cam, a chain device, a high pressure pump and so on which are provided in the CVVT apparatus.

The positive cam torque acts in an advancing direction of the CVVT apparatus, and the negative cam torque acts to a retarding direction thereof.

Accordingly, while the CVVT apparatus operates, it is required to control an operating condition of the CVVT through determining whether the cam torque is positive or negative using a crank sensor and a cam sensor.

In the intermediate phase CVVT apparatus, when the engine is started, the cam is positioned at the parking position. After the engine is started, when the intermediate phase CVVT apparatus first operates and the cam is controlled and changed from the parking position to the advancing position or the holding position and at this time the retard oil flow path serves, the CVVT may be momentarily retarded, thus engine speed may decreases. In this case, when the cam torque is negative, since the cam torque is applied to the cam in the retarding direction as an adverse condition, problems with respect to undershoot of the cam and decrease of engine speed may deteriorate.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a method and system for controlling CVVT that may prevent a decrease of engine speed due to retarding (or a retard angle) of the CVVT according to a negative cam torque by estimating directivity of cam torque when the CVVT first operates.

Various aspects of the present invention are further directed to providing a method and system for controlling CVVT that may optimally control the CVVT according characteristics of an engine and characteristics of a flow path of an intermediate phase CVVT apparatus, by combining a state of cam torque with a condition of operating the CVVT when the CVVT is positioned at a locking position and a target value of the CVVT is set at an advancing position or a holding position, by restricting operation of the CVVT when the cam torque is negative (−), and by operating the CVVT when the cam torque is positive (+).

According to various aspects of the present invention, a method for controlling continuously variable valve timing (CVVT) may include determining, by a CVVT controller, whether CVVT control is started, detecting, by the CVVT controller, a position of a cam by a cam sensor and a position of a crankshaft by a crank sensor when the CVVT control is started, determining, by the CVVT controller, whether the cam is positioned at a locking position based on the position of the cam and the position of the crankshaft, determining, by the CVVT controller, whether the cam is controlled to be positioned from the locking position to an advancing position or a holding position, when the cam is positioned at the locking position, and when the cam is controlled to be positioned from the locking position to the advancing position or the holding position and when a condition for performing the CVVT control is satisfied, determining, by the CVVT controller, whether a cam torque is negative and performing predetermined CVVT control, by the CVVT controller, after waiting a predetermined time when the cam torque is negative.

The method may further include immediately performing, by the CVVT controller, the predetermined CVVT control when the cam torque is positive, in which the CVVT control is control for intermediate phase CVVT.

The predetermined time may be a time that it takes for the cam torque to be changed from a positive state to a negative state.

The condition of performing the CVVT control may be set based on a battery temperature, and an oil temperature and an oil pressure of a CVVT apparatus.

When it is required to identify whether the cam torque is positive or negative, the cam may be positioned at the locking position.

According to various aspects of the present invention, a system for controlling continuously variable valve timing (CVVT) may include a cam sensor configured to detect a position of a cam, a crank sensor configured to detect a position of a crankshaft, a CVVT apparatus provided with an oil control valve and an oil temperature sensor, an engine electronic control apparatus (ECU) configured to control an engine, and a CVVT controller configured to control the CVVT apparatus based on signals of the cam sensor, the crank sensor, and the ECU, in which the CVVT controller is operated by a predetermined program for executing the aforementioned methods of the present invention.

As described above, according to various embodiments of the present invention, a method and system for controlling CVVT can be provided to prevent a decrease of engine speed due to retarding (or a retard angle) of the CVVT according to a negative cam torque by estimating directivity of cam torque when the CVVT first operates.

Further, according to various embodiments of the present invention, a method and system for controlling a CVVT can be provided to optimally control the CVVT according to characteristics of an engine and characteristics of a flow path of an intermediate phase CVVT apparatus, by combining a state of cam torque with a condition of operating the CVVT when the CVVT is positioned at a locking position and a target value of the CVVT is set at an advancing position or a holding position, by restricting operation of the CVVT when the cam torque is negative (−), and by operating the CVVT when the cam torque is positive (+).

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 4:
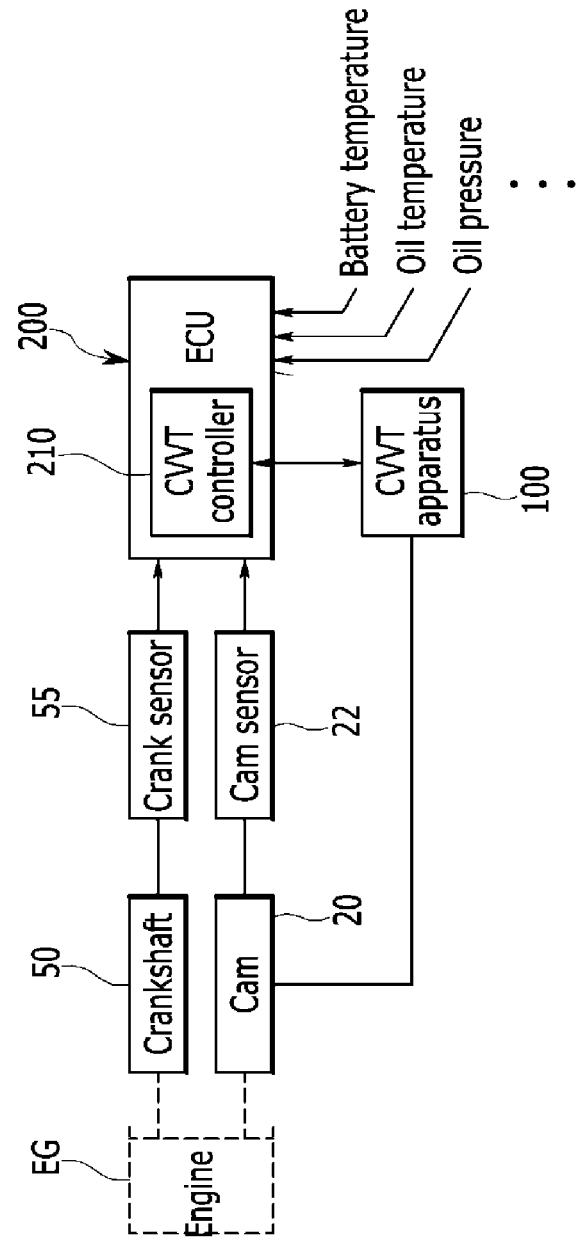
FIG. 4 is a block diagram of an exemplary system for controlling CVVT according to the present invention.

FIG. 4 is a block diagram of a system for controlling a CVVT according to various embodiments of the present invention.

The system for controlling the CVVT according to various embodiments of the present invention controls intermediate phase CVVT in consideration of characteristics of cam torque.

The system for controlling CVVT according to various embodiments of the present invention includes: a cam sensor 22 configured to detect a position of a cam 20; a crank sensor 55 configured to detect a position of a crankshaft 50; a CVVT apparatus 100 that is provided with an oil control valve and an oil temperature sensor; an engine electronic control unit (ECU) 200 configured to control an engine (EG); and a CVVT controller 210 configured to control the CVVT apparatus 100 based on signals of the cam sensor 22, the crank sensor 55, and the ECU 200.

The cam 20 and the crankshaft 50 may be those that are typically included in an engine system for performing CVVT control.

The cam sensor 22 and the crank sensor 55 may be those that are typically included in the engine system for performing the CVVT control, but it should be understood that the scope of the present invention is not limited thereto. Even if the configurations are different from the above configuration, the technical spirit of the present invention may be applicable to any configuration that can substantially detect the positions of the cam and the crankshaft.

The CVVT apparatus 100 may be a typical intermediate phase CVVT apparatus for performing the intermediate phase CVVT control.

The CVVT controller 210 is one or more microprocessors and/or hardware including a microprocessor that can be operated by a predetermined program, wherein the predetermined program may include a series of commands for executing the method for controlling the CVVT to be described later according to various embodiments of the present invention.

The CVVT controller 210 may, as shown in FIG. 4, be included in the ECU 200. In addition, the CVVT controller 210 may include the ECU 200.

Hereinafter, a method for controlling CVVT according to various embodiments of the present invention will be described in detail with reference to the accompanying drawings.

Figure 5:
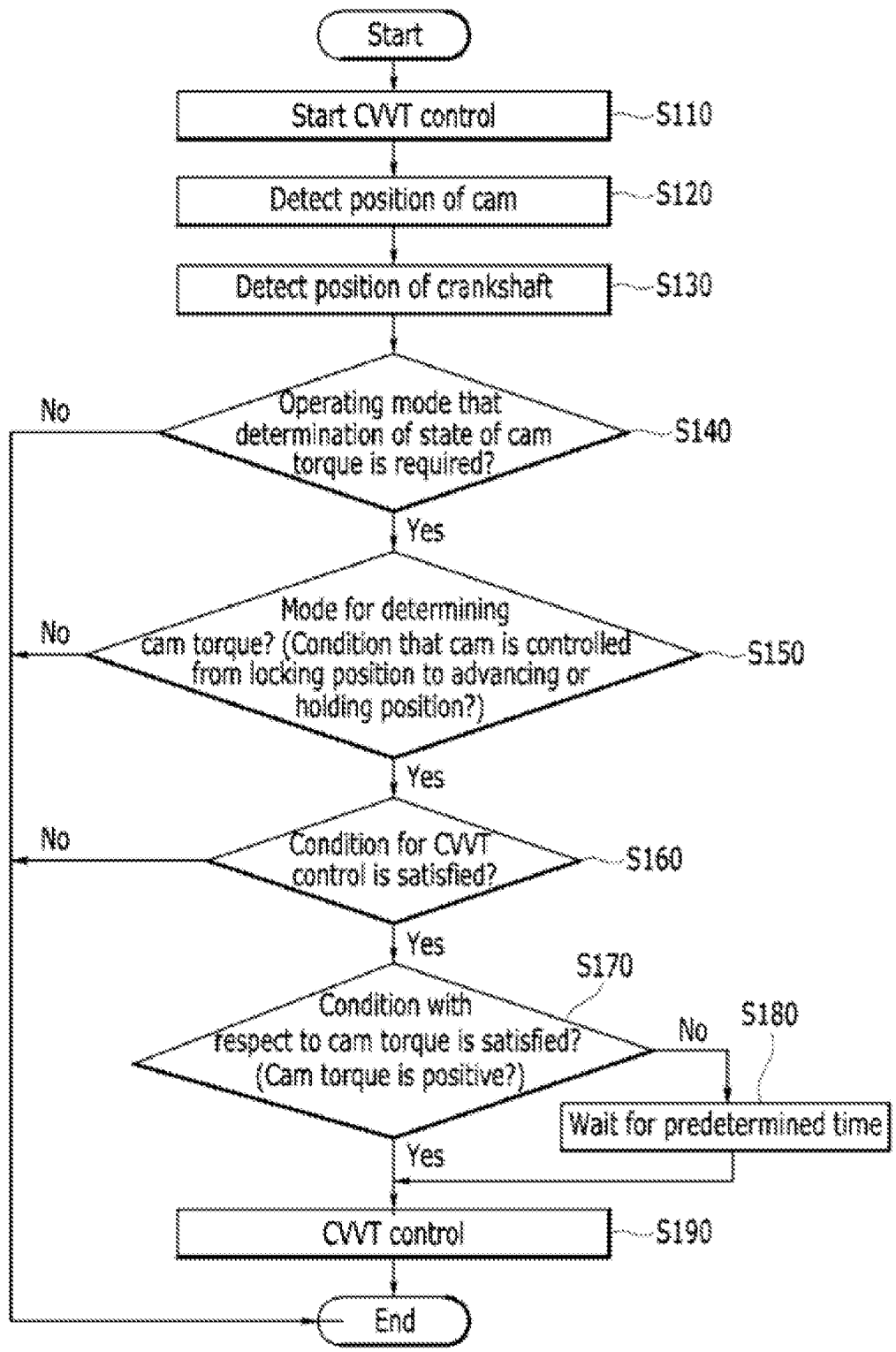
FIG. 5 is a flowchart of an exemplary method for controlling the CVVT according to the present invention.

FIG. 5 is a flowchart of a method for controlling CVVT according to various embodiments of the present invention.

As shown in FIG. 5, when the engine (EG) is started or operated, the CVVT controller 210 determines whether CVVT control is started (S110).

The starting and/or the operation of the engine are controlled by the ECU 200, and the CVVT control is performed depending on the starting and/or the operation of the engine, as is well-known to a person of ordinary skill in the art.

The determining of whether the CVVT control is started may be performed according to the conventional art.

When the starting of the CVVT control is determined or identified at step S110, the CVVT controller 210 detects a position of the cam 20 by the cam sensor 22 and a position of the crankshaft 50 by the crank sensor 55 (S120 and S130).

When the position of the cam 20 and the position of the crankshaft 50 are detected by the cam sensor 22 and by the crank sensor 55, respectively, the CVVT controller 210 determines whether it is required to identify whether a cam torque is positive or negative based on the position of the cam and the position of the crankshaft (S140).

In other words, the CVVT controller 210 determines whether a state of the cam torque needs to be determined or identified based on the detected position of the cam 20 and the detected position of the crankshaft 50. For example, the CVVT controller 210 may determine when the cam 20 is positioned at the locking position while the engine is started as an operating mode in which the state of the cam torque needs to be determined.

When the state of the cam torque needs to be determined, that is, when whether the cam torque is positive or negative needs to be determined, the CVVT controller 210 determines whether the cam 20 is controlled from the locking position to the advancing position or the holding position (S150).

For example, that the cam 20 is controlled from the locking position to the advancing position or the holding position may be determined using signals of the ECU 200, as is well-known to a person skilled in the art.

When the cam 20 is controlled from the locking position to the advancing position or the holding position, the CVVT controller 210 determines or identifies whether a condition for the CVVT control is satisfied (S160).

Whether the condition for the CVVT control is satisfied may be determined or identified based on a battery temperature, and an oil temperature and an oil pressure of the CVVT apparatus 100.

When the condition for the CVVT control is satisfied at step S160, the CVVT controller 210 determines whether the cam torque is positive (S170). When the cam torque is negative (i.e. not positive) at step S170, the CVVT controller 210 performs predetermined CVVT control after waiting for a predetermined time (S180 and S190).

Figure 1:
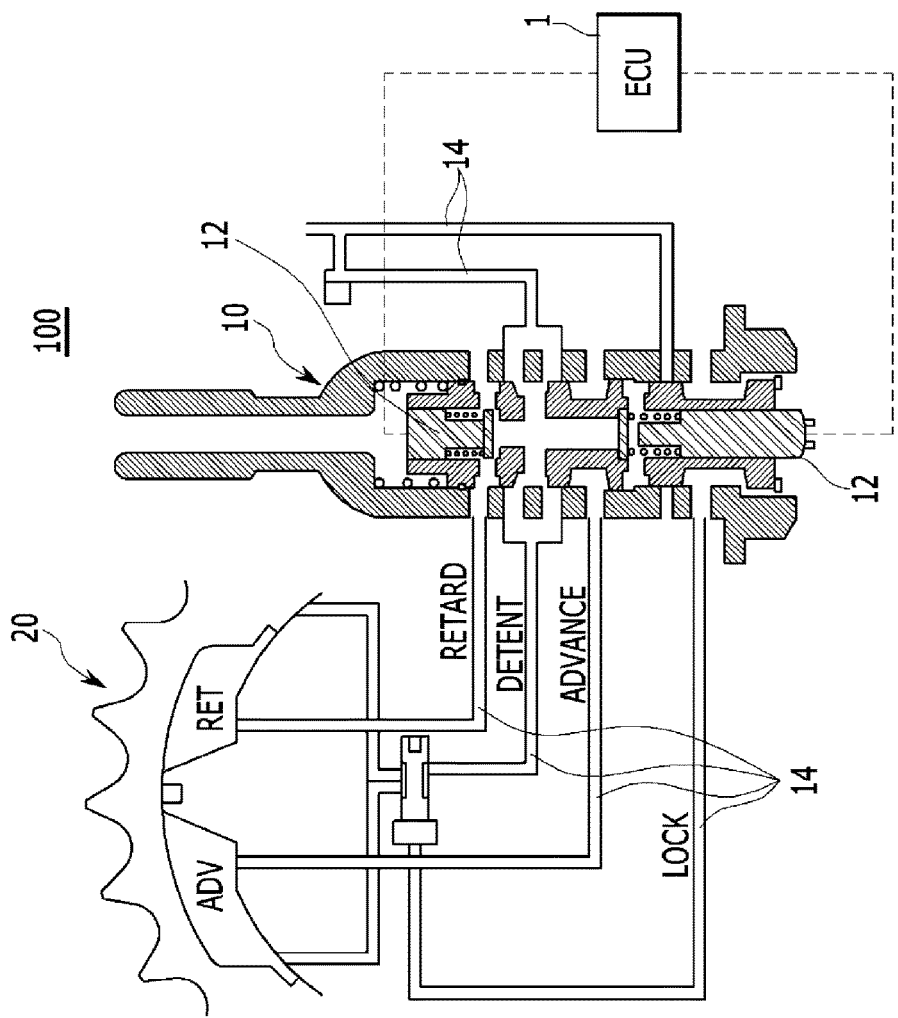
FIG. 1 is a schematic diagram illustrating a typical CVVT apparatus.
Figure 2:
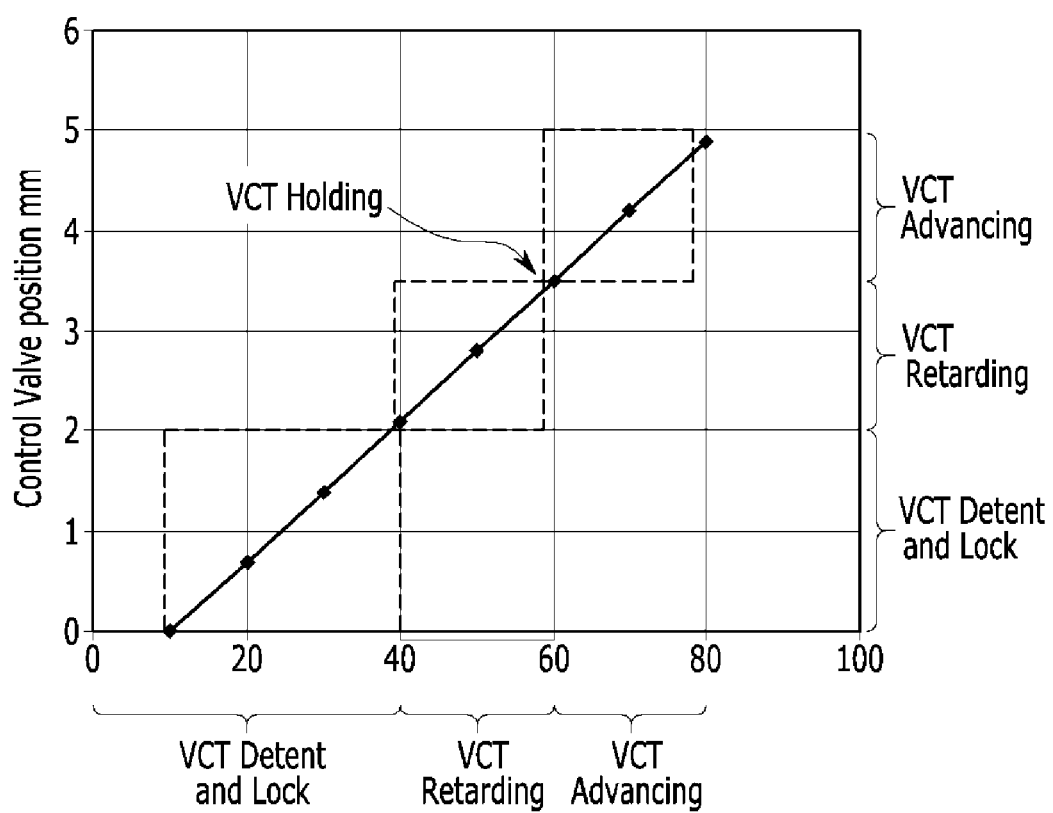
FIG. 2 is a graph illustrating positions of a cam according to operation of a typical CVVT apparatus.
Figure 3:
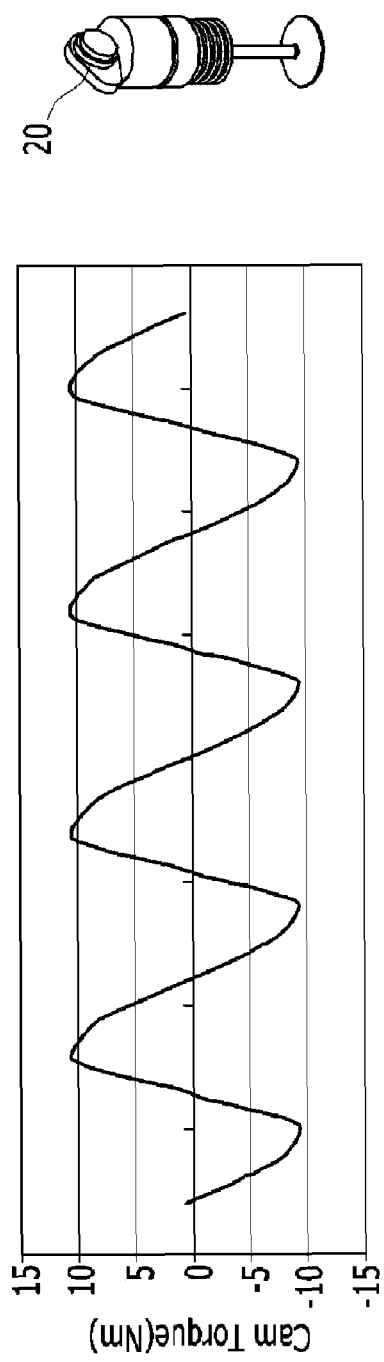
FIG. 3 is a graph illustrating a changing state of a typical cam torque.

The predetermined time may be, as shown in FIG. 3, a time that it takes for the cam torque to be changed from a positive state to a negative state.

Therefore, according to various embodiments of the present invention, it is possible to prevent a decrease of engine speed due to retarding (or a retard angle) of the CVVT according to a negative cam torque by estimating directivity of cam torque when the CVVT first operates.

When the cam torque is positive at step S170, the CVVT controller 210 immediately performs the predetermined CVVT control (S190).

In other words, when the cam torque is positive at step S170, the CVVT controller 210 may perform the CVVT control according to the conventional art.

As described above, according to various embodiments of the present invention, it is possible to optimally control the CVVT according to characteristics of an engine and characteristics of a flow path of an intermediate phase CVVT apparatus, by combining a state of cam torque with a condition of operating the CVVT when the CVVT is positioned at a locking position and a target value of the CVVT is set at an advancing position or a holding position, by restricting operation of the CVVT when the cam torque is negative (−), and by operating the CVVT when the cam torque is positive (+).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling continuously variable valve timing (CVVT), the method comprising:
   determining, by a CVVT controller, whether a CVVT control is started;
   detecting, by the CVVT controller, a position of a cam by a cam sensor and a position of a crankshaft by a crank sensor when the CVVT control is started;
   determining, by the CVVT controller, whether the cam is positioned at a locking position based on the position of the cam and the position of the crankshaft;
   determining, by the CVVT controller, whether the cam is controlled to be positioned from the locking position to an advancing position or a holding position, when the cam is positioned at the locking position; and
   when the cam is controlled to be positioned from the locking position to the advancing position or the holding position and when a condition for performing the CVVT control is satisfied, determining, by the CVVT controller, whether a cam torque is negative, and performing predetermined CVVT control, by the CVVT controller, after waiting a predetermined time when the cam torque is negative.

2. The method of claim 1, further comprising performing, by the CVVT controller, the predetermined CVVT control when the cam torque is positive,
   wherein the CVVT control is control for intermediate phase CVVT.

3. The method of claim 1, wherein the predetermined time is a time that it takes for the cam torque to be changed from a positive state to a negative state.

4. The method of claim 3, wherein the condition of performing the CVVT control is set based on a battery temperature, and an oil temperature and an oil pressure of a CVVT apparatus.

5. A system for controlling continuously variable valve timing (CVVT), the system comprising:
   a cam sensor configured to detect a position of a cam;
   a crank sensor configured to detect a position of a crankshaft;
   a CVVT apparatus provided with an oil control valve and an oil temperature sensor;
   an engine electronic control apparatus (ECU) configured to control an engine; and
   a CVVT controller configured to:
      determine whether a CVVT control is started;
      detect a position of a cam by a cam sensor and a position of a crankshaft by a crank sensor when the CVVT control is started;
      determine whether the cam is positioned at a locking position based on the position of the cam and the position of the crankshaft;
      determine whether the cam is controlled to be positioned from the locking position to an advancing position or a holding position, when the cam is positioned at the locking position; and
      when the cam is controlled to be positioned from the locking position to the advancing position or the holding position and when a condition for performing the CVVT control is satisfied, determine whether a cam torque is negative, and performing predetermined CVVT control after waiting a predetermined time when the cam torque is negative.

* * * * *